United States Patent
Moussaoui et al.

(10) Patent No.: US 7,054,176 B2
(45) Date of Patent: May 30, 2006

(54) ARCHITECTURE FOR ACHIEVING RESONANT CIRCUIT SYNCHRONIZATION OF MULTIPLE ZERO VOLTAGE SWITCHED PUSH-PULL DC-AC CONVERTERS

(75) Inventors: Zaki Moussaoui, Palm Bay, FL (US); Thomas Victorin, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 11/047,154

(22) Filed: Jan. 31, 2005

(65) Prior Publication Data

US 2006/0092677 A1 May 4, 2006

Related U.S. Application Data

(60) Provisional application No. 60/624,573, filed on Nov. 3, 2004.

(51) Int. Cl.
  *H02M 7/48* (2006.01)
(52) U.S. Cl. ............... 363/71; 363/25; 363/134
(58) Field of Classification Search ........... 363/22–26, 363/65, 71, 133, 134
See application file for complete search history.

(56) References Cited

U.S. PATENT DOCUMENTS

| | | | | |
|---|---|---|---|---|
| 4,222,098 A | * | 9/1980 | Frosch et al. | 363/71 |
| 5,852,555 A | * | 12/1998 | Martin | 363/71 |
| 6,169,668 B1 | * | 1/2001 | Clayton | 363/26 |
| 6,754,090 B1 | * | 6/2004 | Arai et al. | 363/17 |

* cited by examiner

*Primary Examiner*—Gary L Laxton
(74) *Attorney, Agent, or Firm*—Allen, Dyer, Doppelt, Milbrath & Gilchrist, P.A.

(57) ABSTRACT

A multi-stage, push-pull driven, resonant DC-AC converter ties the center-taps of primary windings of respective push-pull stages together, and drives each center-tap with a current source. Tying the center-taps of the primary windings of the respective DC-AC converters' transformers together forces the voltages at these locations to be the same, so as to achieve mutual resonant synchronization between the two stages. Connecting the center-taps to a current source provides the necessary power for each stage and allows for a variation in current between stages, as the center-tap voltages track one another. The tied-together center-tap voltage is monitored to obtain the zero voltage switching required for efficient operation of switching devices of each DC-AC converter stage.

9 Claims, 2 Drawing Sheets

ARCHITECTURE FOR ACHIEVING RESONANT CIRCUIT SYNCHRONIZATION OF MULTIPLE ZERO VOLTAGE SWITCHED PUSH-PULL DC-AC CONVERTERS

CROSS-REFERENCE TO RELATED APPLICATION

The present application claims the benefit of previously filed, co-pending U.S. Application Ser. No. 60/624,573, filed Nov. 3, 2004, by Z. Moussaoui et al, entitled: "Architecture for Achieving Resonant Circuit Synchronization of Multiple Zero Voltage Switched Push-Pull DC-AC Converters," assigned to the assignee of the present application and the disclosure of which is incorporated herein.

FIELD OF THE INVENTION

The present invention relates in general to power supply systems and subsystems thereof, and is particularly directed to a DC-AC converter architecture that is operative to achieve resonant circuit-based synchronization of multiple DC-AC push-pull converter stages, each of which incorporates a respective LC tank circuit in its switched output supply path.

BACKGROUND OF THE INVENTION

FIG. 1 diagrammatically illustrates a conventional push-pull DC-AC converter which incorporates a resonant LC tank circuit in its switched output path, so that its output voltage will vary in a generally sinusoidal manner. To this end, the converter comprises an upper controlled switching device 10, shown as a field effect transistor (FET), which has its source-drain path coupled between a prescribed reference voltage (e.g., ground (GND)) 11, and a first end 13 of an upper coil portion 15 of a center-tapped primary winding 17 of an output transformer 19. In a complementary manner, a lower controlled switching device 20, also shown as a field effect transistor, has its source-drain path coupled between the prescribed reference voltage (GND) 11 and a first end 21 of a lower coil portion 23 of the transformer's primary winding 17. The transformer's primary winding 17 has a center-tap 25 coupled to a voltage source 27. A capacitor 31 is coupled across the two ends 11 and 21 of the primary winding 17 and forms therewith a resonant LC tank circuit, the functionality of which is to cause the switched output of the DC-AC converter to have a generally sinusoidal shape. This sinusoidally varying output is extracted at the output terminals 33 and 35 of a secondary transformer winding 37, which is mutually coupled with the respective upper and lower coil portions 15 and 23 of primary winding 17.

In operation, with the lower FET 20 being OFF, the upper FET 10 is turned ON by the application of a switching waveform to its control (gate) input 12, so that a current flow path is provided from the voltage source 27, through the upper coil portion 15 of the transformer's primary winding 17 and through the source-drain path of the FET 10. This switched 'push' current through the upper coil portion of the transformer's primary winding 17, in turn, produces an output voltage waveform across the transformer's output terminals 33 and 35. This output voltage waveform has a first polarity (e.g., positive), in accordance with the polarity of the magnetic coupling between the upper coil of the primary winding and the secondary winding of the transformer.

Thereafter, the upper FET 10 is turned OFF and the lower FET 20 is turned ON by the application of a switching waveform to the control (gate) input 22 of the lower FET, so that a current flow path is provided from the voltage source 27, through the lower coil portion 23 of the transformer's primary winding 17 and through the source-drain path of the FET 20. This switched 'pull' current through the lower coil portion of the transformer's primary winding, in turn, produces an output voltage waveform across the output terminals 33 and 35. This output voltage waveform has a second polarity (e.g., negative), in accordance with the polarity of the magnetic coupling between the lower coil of the primary winding and the secondary winding of the transformer.

For optimal performance and efficiency, the frequency of the controlled ON-OFF switching of the two FETs corresponds to the resonant frequency of the LC tank circuit formed by primary winding 17 and the capacitor 31, and the switching of the FETs is controlled so as to occur at points in time when the voltage across the FETs (or at the opposite ends of the primary winding) equals zero. Namely, the two coil portions of the transformer's primary winding are effectively 'pumped' by zero voltage-switched FETs at the resonant frequency of the LC tank circuit formed by primary winding 17 and the capacitor 31, so as to produce a very sinusoidal output waveform at output terminals 33 and 35.

Where the parameters of the desired AC output voltage can be supplied by a single push-pull DC-AC converter stage as described above, the circuit of FIG. 1 works substantially well. However, in many applications it is desired to obtain a larger amplitude AC output voltage than is produced by the single stage configuration of FIG. 1. Such a larger voltage is customarily realized by differentially combining the outputs of a pair of stages configured as shown in FIG. 1. As a non-limiting example, it may be desired to employ a pair of the circuits shown in FIG. 1 to drive opposite ends of a cold cathode fluorescent lamp (CCFL), of the type found in large scale display applications, such as large scale television screens, which require an associated set of high AC voltage-driven cold cathode fluorescent lamps (CCFLs) mounted directly behind the screens for backlighting purposes. Indeed, large LCD panels require relatively large numbers (e.g., on the order of ten to forty) of such CCFLs for uniform backlighting.

Unfortunately, the inherent differences in the parameters of each DC-AC converter's components cause the two output voltage waveforms produced thereby to have slightly different frequencies. This leads to two problems. First, due to variations in the components of the two tank circuits, which are not a priori known, the resonant frequencies of the two circuits are not exactly the same, resulting in the output voltage waveform containing beat frequencies, which are undesirable. Secondly, as shown in the encircled portion of the output voltage waveform of FIG. 2, this slight difference in resonant frequencies prevents efficient zero voltage-switching of both of the push-pull switching stages that drive the tank circuits, thereby reducing the operational efficiency of one or both converters.

SUMMARY OF THE INVENTION

In accordance with the present invention, these and other shortcomings of conventional multi-stage, push-pull driven, resonant DC-AC converter architectures are effectively obviated by tying the center-tap points of the primary windings of the respective push-pull stages together, and driving each center-tap with a current source, rather than a voltage source. Tying the center-taps of the primary windings of the respective DC-AC converters' transformers together forces the voltages at these locations to be the same, so as to achieve mutual resonant synchronization between the two stages. Connecting the center-taps to a current source, rather than a voltage source, provides the necessary power for each stage and allows for a variation in current between stages, as the center-tap voltages track one another. In addition, the tied-together center-tap voltage is monitored to obtain the zero voltage switching required for efficient operation of the FETs of each DC-AC converter stage.

DETAILED DESCRIPTION

Figure 1:
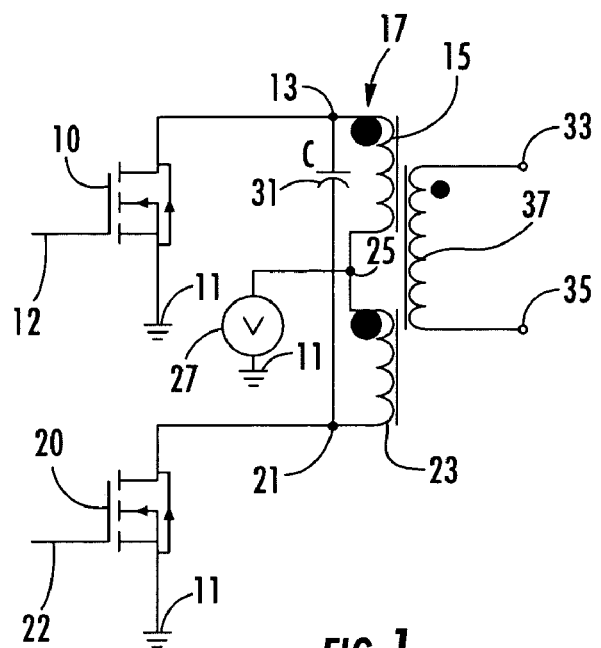
FIG. 1 diagrammatically illustrates a conventional push-pull DC-AC converter, which incorporates a resonant LC tank circuit in its switched output path, so that its output voltage will vary in a generally sinusoidal manner.
Figure 2:
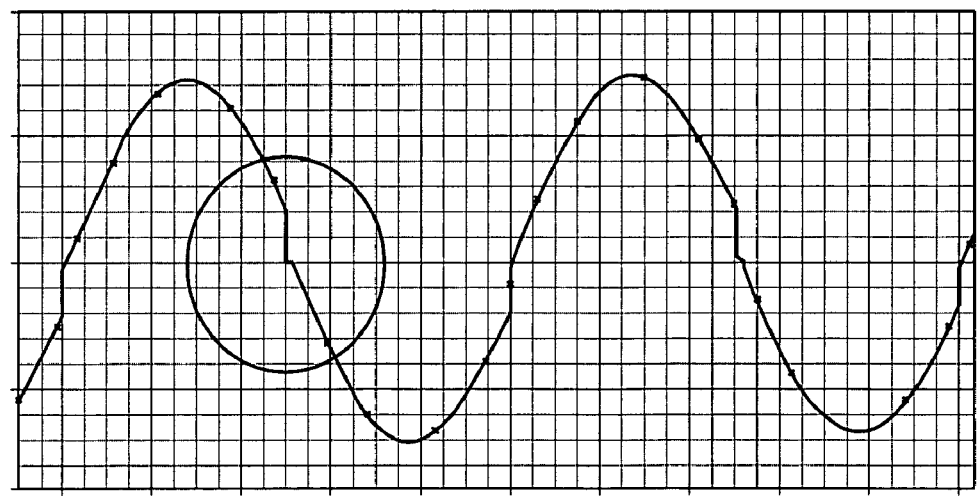
FIG. 2 shows an output voltage waveform produced by a respective stage of a multiple push-pull DC-AC converter arrangement of the type shown in FIG. 1, having respectively different resonant frequencies that leads to a dead time or not having switched a FET of a respective push-pull switching stage at a zero-crossing time of the resonant waveform, reducing the operational efficiency of one or both converters.
Figure 3:
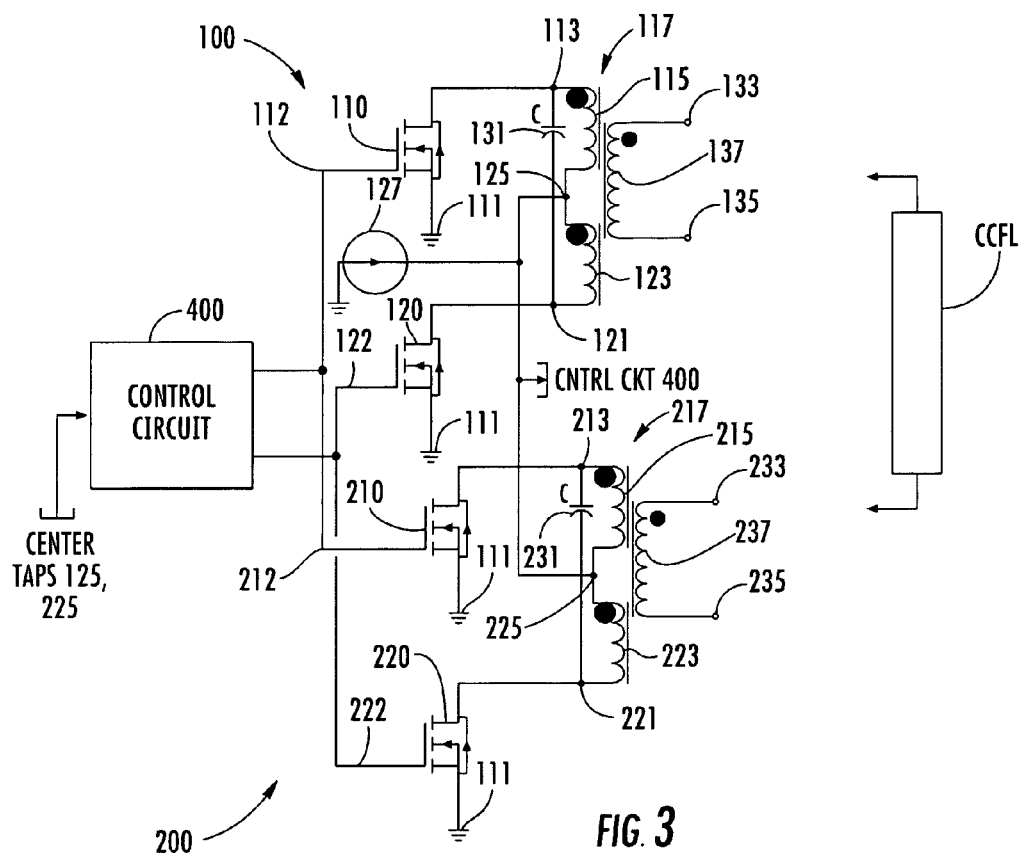
FIG. 3 is a diagrammatic illustration of a multistage, push-pull driven, resonant DC-AC converter in accordance with an embodiment of the present invention.

Attention is now directed to FIG. 3, which is a diagrammatic illustration of a multistage, push-pull driven, resonant DC-AC converter in accordance with an embodiment of the present invention. As shown therein, the converter comprises an upper DC-AC converter stage 100 and a lower DC-AC converter stage 200. These two stages are tied together by connecting the center-taps of their respective primary transformer windings together. In particular, similar to the resonant tank-based, push-pull DC-AC converter of FIG. 1, the upper stage 100 comprises an upper controlled switching device 110, shown as an FET, which has its source-drain path coupled between a prescribed reference voltage (e.g., GND) 111, and a first end 113 of an upper coil portion 115 of a center-tapped primary winding 117 of an output transformer 119.

In a complementary manner, a lower controlled switching device 120, also shown as a field effect transistor, has its source-drain path coupled between the prescribed reference voltage (GND) 111 and a first end 121 of a lower coil portion 123 of the transformer's primary winding 117. In accordance with the invention, power for the upper DC-AC converter stage 100 is realized by coupling the center-tap 125 of the transformer's primary winding 117 to a current source 127. A capacitor 131 is coupled across the two ends 111 and 121 of the primary winding 117 and forms therewith a resonant LC tank circuit, so as to cause the switched output of the upper DC-AC converter stage 100 to have a generally sinusoidal shape, as described above. This sinusoidally varying output waveform is extracted at the output terminals 133 and 135 of a secondary transformer winding 137, which is mutually coupled with the respective upper and lower coil portions 115 and 123 of primary winding 117.

The lower DC-AC converter stage 200 comprises an upper controlled switching device (FET) 210, which has its source-drain path coupled between ground (GND) and a first end 213 of an upper coil portion 215 of a center-tapped primary winding 217 of an output transformer 219. A lower controlled switching device (FET) 220 has its source-drain path coupled between the prescribed reference voltage (GND) 211 and a first end 221 of a lower coil portion 223 of the transformer's primary winding 217. Power for the lower DC-AC converter stage 200 is realized by coupling the center-tap 225 of the transformer's primary winding 217 to the current source 127, so that both primary windings have their center-taps 125 and 225 connected in common to a current source 127. A capacitor 231 is coupled across the two ends 211 and 221 of the primary winding 217 and forms therewith a resonant LC tank circuit, which causes the switched output of the lower DC-AC converter stage 200 to have a generally sinusoidal shape, as described above. This sinusoidally varying output waveform is extracted at the output terminals 233 and 235 of a secondary transformer winding 237, which is mutually coupled with the respective upper and lower coil portions 215 and 223 of primary winding 217.

The control (gate) inputs of FETs 110 and 210 are coupled to receive a common switching control input, from a control circuit 400, so that FETs 110 and 210 are turned ON and OFF at the same time; likewise, the control (gate) inputs of FETs 120 and 220 are coupled to receive a common switching control input from control circuit 400, so that FETs 120 and 220 are turned ON and OFF at the same time. In accordance with the invention, the turn ON and turn OFF times for the control inputs to the FETs of both the upper and lower stages 100 and 200 are derived by control circuit 400 monitoring the instant in time when the resonating voltage at the connected-in-common center-taps 125 and 225 of the transformers' primary windings crosses zero volts. In particular, when the center-tap voltage cross zero as a positive-transitioning voltage, control circuit 400 turns ON each of the upper FETs 110 and 210, and turns OFF the lower FETs 120 and 220. In a complementary manner, when the center-tap voltage cross zero as a negative-transitioning voltage, control circuit 400 turns each of the FETs 110 and 210 OFF, and turns each of the lower FETs 120 and 2200N.

It is to be realized that, although, due to manufacturing tolerances, the values of capacitance and inductance of the tank circuits of the upper and lower DC-AC converter stages are not expected to be exactly the same, they are nominally the same for both stages, so that the tank circuits have approximately the same resonant frequencies. The resonant frequencies of the two tank circuits are made to conform with or acquire the same resonant frequency by connecting the center-taps of the transformers primary windings together. Analysis of the equivalent circuits when the FETs are turned ON in the manner described above reveals that, when the drains of the FETs reach zero volts, the center-taps will also go to zero volts, because the body diode is conducting and shorting the associated transformer winding. This means that the center-tap can be used to monitor zero crossing, as described above. By connecting the center-taps of multiple stages together, all stages are forced to conform with a common resonant frequency.

Figure 4:
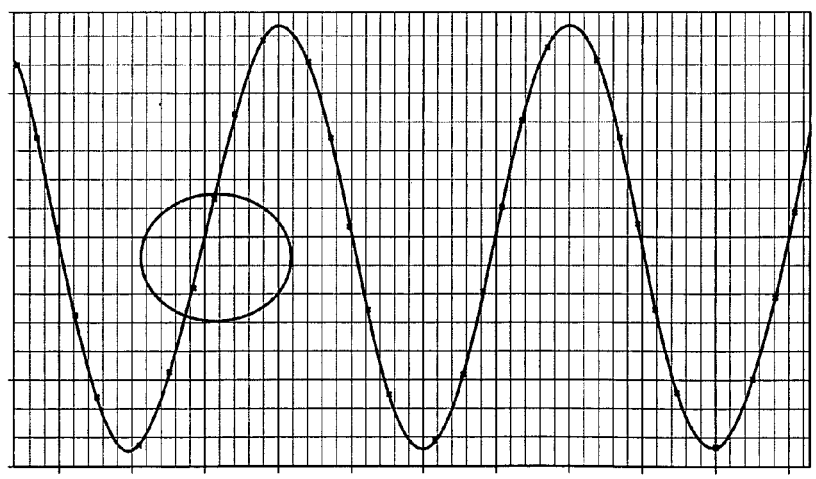
FIG. 4 shows an output voltage waveform of a respective DC-AC converter stage of the circuit of FIG. 3, showing the effect of tying the center-taps of the primary windings for the upper and lower DC-AC stages together, which causes a slight shift in the two resonance frequencies toward one another, producing a single resonance for both stages.

Namely, the effect of tying the center-taps of the primary windings for the upper and lower DC-AC stages together is to cause a slight shift in the two resonance frequencies toward one another, producing a single resonance for both stages, as shown by the waveform of FIG. 4. As a result, as the FETs are switched, when the center-tap voltages go to zero volts, what results is the same sinusoidal waveform at the output of each of the upper and lower stages. This equality of the output voltages allows them to be readily used in a differentially combined voltage application, such as driving opposite ends of a CCFL, as described above.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A multistage, push-pull driven, resonant DC-AC converter comprising a plurality of push-pull DC-AC converter stages, each push-pull DC-AC converter stage containing a first controlled switching device having a current flow path therethrough coupled between a prescribed reference voltage and a first end of a first coil portion of a center-tapped primary winding of an output transformer, and a second controlled switching device having a current flow path therethrough coupled between said prescribed reference voltage and a first end of a second coil portion of said center-tapped primary winding of said output transformer, power for said respective DC-AC converter stage being supplied by coupling said center-tap of said primary winding to a current source, and further including a capacitor coupled between said first ends of said first and second coil portions, so as to form therewith a resonant LC tank circuit, and cause the switched output of said respective DC-AC converter stage to have a generally sinusoidal waveform, which is extracted at output terminals of a secondary transformer winding mutually coupled with said first and second lower coil portions of said primary winding, and wherein center-taps of primary windings of said plurality of push-pull DC-AC converter stages are connected in common to said current source, and wherein switching times for control inputs of said first and second switching devices of said respective push-pull DC-AC converter stages are defined in accordance with times at which a resonating voltage at the connected-in-common center-taps of said primary windings crosses zero volts.

2. The multistage, push-pull driven, resonant DC-AC converter according to claim 1, wherein output terminals of secondary windings of output transformers of said respective push-pull DC-AC converter stages are differentially coupled to respectively different power feed terminals of a driven device.

3. The multistage, push-pull driven, resonant DC-AC converter according to claim 2, wherein said driven device comprises a cold cathode fluorescent lamp.

4. A method of generating a sinusoidal output voltage comprising the steps of:
(a) providing a multistage, push-pull driven, resonant DC-AC converter having a plurality of push-pull DC-AC converter stages, each push-pull DC-AC converter stage containing a first controlled switching device having a current flow path therethrough coupled between a prescribed reference voltage and a first end of a first coil portion of a center-tapped primary winding of an output transformer, and a second controlled switching device having a current flow path therethrough coupled between said prescribed reference voltage and a first end of a second coil portion of said center-tapped primary winding of said output transformer, a capacitor coupled between said first ends of said first and second coil portions, so as to form therewith a resonant LC tank circuit, a secondary transformer winding mutually coupled with said first and second lower coil portions of said primary winding, and having output terminals from which is derived said sinusoidal output voltage;
(b) coupling center-taps of primary windings of said plurality of push-pull DC-AC converter stages in common to a current source; and
(c) establishing switching times for control inputs of said first and second switching devices of said respective push-pull DC-AC converter stages in accordance with times at which a resonating voltage at the connected-in-common center-taps of said primary windings crosses zero volts.

5. The method according to claim 4, wherein output terminals of secondary windings of output transformers of said respective push-pull DC-AC converter stages are differentially coupled to respectively different power feed terminals of a driven device.

6. The method according to claim 5, wherein said driven device comprises a cold cathode fluorescent lamp.

7. In a sinusoidal voltage generator comprising a push-pull driven, resonant DC-AC converter including a first controlled switching device having a current flow path therethrough coupled between a prescribed reference voltage and a first end of a first coil portion of a center-tapped primary winding of a first output transformer, and a second controlled switching device having a current flow path therethrough coupled between said prescribed reference voltage and a first end of a second coil portion of said center-tapped primary winding of said first output transformer, a first capacitor coupled between said first ends of said first and second coil portions of said first output transformer, the improvement comprising:
a third controlled switching device having a current flow path therethrough coupled between said prescribed reference voltage and a first end of a first coil portion of a center-tapped primary winding of a second output transformer, and a fourth controlled switching device having a current flow path therethrough coupled between said prescribed reference voltage and a first end of a second coil portion of said center-tapped primary winding of said second output transformer, a second capacitor coupled between said first ends of said first and second coil portions of said second output transformer, and wherein
center-taps of primary windings of said first and second output transformers are connected in common to a current source, and wherein
switching times for control inputs of said first, second, third and fourth switching devices are defined in accordance with times at which a resonating voltage at the connected-in-common center-taps of said primary windings of said first and second output transformers crosses zero volts.

8. The improvement according to claim 7, wherein output terminals of secondary windings of output transformers of said respective push-pull DC-AC converter stages are differentially coupled to respectively different power feed terminals of a driven device.

9. The improvement according to claim 8, wherein said driven device comprises a cold cathode fluorescent lamp.

* * * * *